United States Patent

Giglio et al.

[15] 3,695,766
[45] Oct. 3, 1972

[54] PHOTOSENSITIVE SURFACE SHAPING FOR OPTICAL HETERODYNING

[72] Inventors: Dominick Giglio, Hyattsville, Md.; Glen Wade, Santa Barbara, Calif.

[73] Assignee: The United States of America as represented by the Secretary of the Army

[22] Filed: Jan. 14, 1970

[21] Appl. No.: 2,699

[52] U.S. Cl. .................. 356/141, 356/110, 356/113, 250/199, 338/15, 250/211, 250/208
[51] Int. Cl. ............................ G01b 9/02, H01j 39/12
[58] Field of Search ...... 356/141, 110, 113; 250/211, 250/199, 208; 338/15; 350/161, 163

[56] References Cited

UNITED STATES PATENTS

| | | | |
|---|---|---|---|
| 3,571,579 | 3/1971 | Whitehouse et al. | 250/208 |
| 3,363,104 | 1/1968 | Waite et al. | 250/199 |
| 3,518,007 | 6/1970 | Michiaki Ito | 356/113 |
| 3,076,949 | 2/1963 | Anderson | 250/211 |

Primary Examiner—Benjamin A. Borchelt
Assistant Examiner—S. C. Buczinski
Attorney—Harry M. Saragovitz, Edward J. Kelly, Herbert Berl and J. D. Edgerton

[57] ABSTRACT

A method and apparatus for optical heterodyning with photosensitive surfaces in which the amplitude of the output current is any desired function of the angle of incidence of the incident light beams. This is accomplished by shaping a photosensitive surface in accordance with the inverse Fourier transform of the desired amplitude of current response. The photosensitive surface is divided into two sections, each section containing one or more photosensitive regions. The sum of all currents produced in the first section is substracted from the sum of all currents produced in the second section and the difference current is applied to a resistor to produce the desired output voltage.

7 Claims, 5 Drawing Figures

PATENTED OCT 3 1972    3,695,766

INVENTORS,
DOMINICK GIGLIO
GLEN WADE

BY Harry M. Saragovitz
Edward J. Kelly
Herbert Berl
J. D. Edgerton
ATTORNEYS

PHOTOSENSITIVE SURFACE SHAPING FOR OPTICAL HETERODYNING

RIGHTS OF GOVERNMENT

The invention described herein may be manufactured, used, and licensed by or for the Government for governmental purposes without the payment to me of any royalty thereon.

BACKGROUND OF THE INVENTION

This invention relates to optical heterodyning, and more particularly to a system for shaping a photosensitive surface to obtain any desired function between the amplitude of the output current and the angle of incidence of the light beams.

It is known in the prior art that a photosensitive surface may be employed to obtain the difference or beat frequency of two laser beams. The technique simply involves directing two laser beams at a square law photo-detection surface and measuring the frequency of the output current. One serious difficulty with this technique is that the amplitude of the output current falls off rapidly as the angle of incidence increase from 0° to 90°. In some applications, such as in light diffraction measurement, the angle of incidence varies considerably and consequently the output current often falls to such low levels that it becomes difficult to measure. This invention eliminates this difficulty by shaping the photosensitive surface in such a manner as to provide any desired relationship between the amplitude of output current and the angle of light incidence.

It is therefore a primary object of this invention to provide a photosensitive surface in which the amplitude of output current is any desired function of the angle of incidence of the light.

A more particular object of the invention is to provide a photosensitive surface of which the amplitude of output current is constant regardless of the angle of light incidence.

Still a further object of this invention is to provide a photosensitive surface whose shape can be mathematically determined so as to produce any desired relationship between amplitude of output current and angle of light incidence.

SUMMARY OF THE INVENTION

Briefly in accordance with this invention, a method and apparatus is provided for optical heterodyning in which the amplitude of the output current is any desired function of the angle of incidence of the light. This is achieved by shaping a photosensitive surface in accordance with the inverse Fourier transform of the desired amplitude of current response. The photosensitive surface is divided into two sections, each section containing one or more photosensitive regions. The sum of all currents produced in the first section is subtracted from the sum of all currents produced in the second section and the difference current is applied to a resistor to produce the desired output voltage.

DESCRIPTION OF THE PREFERRED EMBODIMENT

Figure 1:
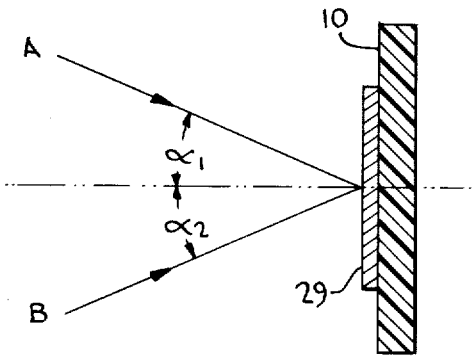
FIG. 1 is a side view of an optical heterodyning system.

The general principles of optical heterodyning can be understood by reference to FIG. 1 which depicts two light beams A and B incident upon a photosensitive surface 29, the photosensitive surface being supported by a suitable substrate 10. As shown in FIG. 1, light beam A is incident at an angle $\alpha_1$ while light beam B is incident at an angle $\alpha_2$. In the conventional heterodyning technique it is important to maintain the angles $\alpha_1$ and $\alpha_2$ as close to zero as possible since any increase in the angle of incidence substantially reduces the amplitude of the current output from the photosensitive surface. Under ideal conditions, when the angles of incidence of both beams equal zero, the frequency of the output current will be the difference frequency of the two incident light beams A and B and the amplitude will be at its maximum.

Figure 2:
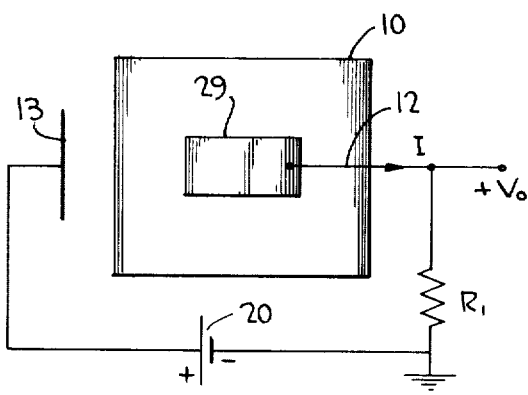
FIG. 2 is a front view of a prior art device for optical heterodyning.

FIG. 2 is a front view of a prior art arrangement for measuring the difference frequency of two light beams. The two beams are directed at photosensitive surface 29 which is generally square or rectangular in shape. Voltage is applied between photosensitive surface 29 and detector plate 13 by means of a suitable DC source 20 and the output voltage signal is measured across a suitable resistor $R_1$.

Figure 3:
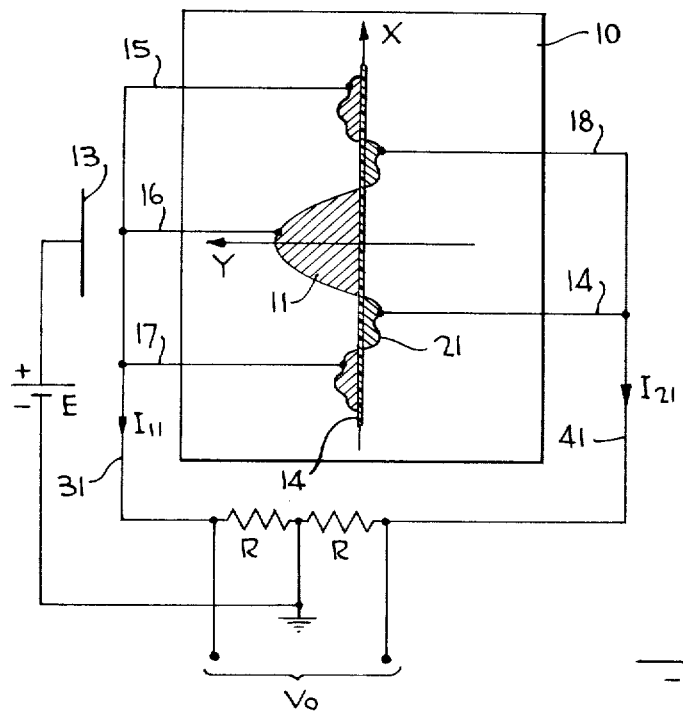
FIG. 3 is a front view of one embodiment of the present invention.

The principles of the present invention can be best understood by reference to FIG. 3 in which the photosensitive surface is deposited upon substrate 10 in accordance with a mathematical equation. Assuming an X-Y coordinate system as shown, the shape of the photosensitive area can be mathematically described by the following equation:

$$Y(x) = A \int_{-\infty}^{+\infty} F(s) \cos(2\pi s) x \, ds$$
$$+ A \int_{-\infty}^{+\infty} F(s) \sin(2\pi s) x \, ds$$

Eq. (1)

where $$s = \frac{\sin \alpha_1 + \sin \alpha_2}{\lambda}$$

$A$ is constant proportional to the photosensitive surface area.

$\lambda$ is the wavelength of the light beams.

$\alpha_1$ is the angle of incidence of the first light beam.

$\alpha_2$ is the angle of incidence of the second light beam.

$F(s)$ is the desired functional relationship between the amplitude of the output current and the angle of incidence of the light beams.

For a mathematical derivation of Equation (1) the reader is referred to the inventor's dissertation entitled "'Slow'b' Bandwidth Considerations of the Laser Acoustic Delay Line" Submitted to the Graduate School of the University of Maryland, 1969. It will suffice here to point out that the formula is a general expression for the inverse Fourier transform of the desired current response.

Broken down into its component the equation represents the sum of the real and imaginary parts of the inverse Fourier transform. Alternatively, the equation may be viewed as the sum of the inverse cosine transform and the inverse sine transform.

The only limitation on $F(s)$ is that it must be a symmetrical function, that is, it must be either strictly an even function or strictly an odd function. If $F(s)$ is an even function then the sine transform will integrate to zero and if it is an odd function the cosine transform will be zero.

Referring again to FIG. 3, the photosensitive material is deposited on substrate 10 in two electrically insulated sections, the first section corresponding to the regions of X where $Y(x) > 0$ and the second section for $Y(x) < 0$. The two sections are physically separated by an insulating strip 14. Each section may contain one or more electrically insulated photosensitive regions 11 and 21.

In order to produce the desired output response it is necessary to first add the currents generated in each of the photosensitive regions of the first section as well as in each of the photosensitive regions of the second section and then to obtain the difference between currents generated in the first section and currents generated in the second section. This is accomplished by supplying suitable leads 15, 16, and 17 to each of regions 11 which are located to the left of insulating strip 14 and adding these currents in lead 31 to obtain the total current $I_{11}$. Similarly, leads 18 and 19 are connected to each of regions 21 located to the right of insulating strip 14 and currents in these leads are added in lead 41 to obtain the total current $I_{21}$. The difference of currents $I_{11}$ and $I_{21}$ is obtained by connecting leads 31 and 41 in series opposition as shown in FIG. 3 and an output voltage response is obtained across equal resistors R.

Figure 4:
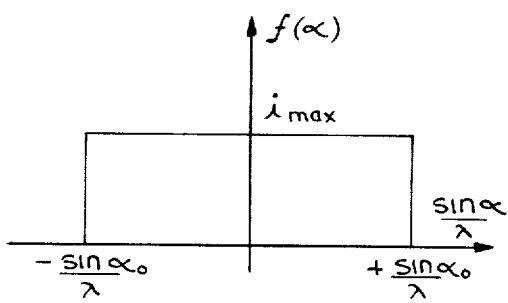
FIG. 4 illustrates one form of current response which may be obtained with this invention.

Equation (1) will yield the shape of the photosensitive regions necessary to produce any desired amplitude of output current as a function of the angle of incidence of the light beams. As an example, suppose it is desired to produce an output current which is constant and equal to $i_{max}$ whenever angle $\alpha_1$ is between $-\alpha_o$ and $+\alpha_o$, and which is equal to zero outside this range. $\alpha_2$ is assumed to be zero in this example. This even function is illustrated in FIG. 4. It should be noted that the physical limits on $\alpha_1$ are $\pm 90°$ since any angle in excess of this would result in the light beam arriving behind the substrate 10. Applying the above equation to the function described in FIG. 4 one obtains the following expression:

$$Y(x) = A \int_{-\sin \alpha_0/\lambda}^{+\sin \alpha_0/\lambda} \cos\left(2\pi \frac{\sin \alpha_1}{\lambda}\right) x \, d\left(\frac{\sin \alpha_1}{\lambda}\right) + 0$$

$$= 2A \frac{\sin\left(2\pi \frac{\sin \alpha_0}{\lambda}\right) x}{2\pi x}$$

$$= \frac{2A \sin \alpha_0}{\lambda} \cdot \frac{\sin\left(2\pi \frac{\sin \alpha_0}{\lambda}\right) x}{\left(2\pi \frac{\sin \alpha_0}{\lambda}\right) x}$$

Substituting $$L = \frac{2A \sin \alpha_0}{\lambda}$$

and $$B = \frac{2 \sin \alpha_0}{\lambda}$$

Yields $$Y(x) = L \frac{\sin \pi BX}{\pi BX}$$

Eq. (2)

Figure 5:
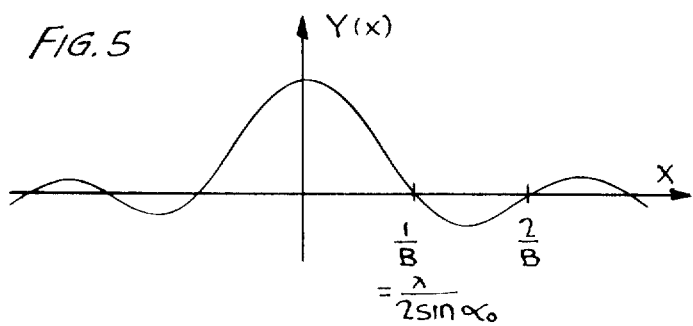
FIG. 5 illustrates the shape of a photosensitive surface for producing the current response shown in FIG. 4.

The required shape of the photosensitive region $Y(x)$ defined by equation (2) is depicted in FIG. 5. It will be appreciated that the required shape illustrated in FIG. 5 is an even and continuous function of infinite length along the X-axis. Naturally the physical detector cannot be infinitely long, however a good approximation can be obtained by using only three photosensitive regions on each side of the Y-axis since most of the current is generated in these regions.

Thus far it has been assumed that the intensities of both light beams are constant and do not vary as a function of time or of the angle of incidence. This is a valid assumption since ordinarily the size of the photodetector will be small compared to the area covered by the light beam and any variation of intensity across the light beam will not be sensed by the detector. Additionally it should be noted that the angle of incidence may itself be a varying function of time or some other variable. In any case the expression given by Equation (1) would be valid and it would be merely a matter of ordinary skill in the art, using well known techniques of mathematical calculation, to arrive at the required shape of the photosensitive surface.

It should be understood that we do not desire to be limited to the exact details shown and described for obvious modifications may be made by those skilled in the art. The final shape need not conform exactly to the equation since any reasonable approximation will produce adequate results. Thus the shape shown in FIG. 5 for example may be approximated by a series of straight lines.

We claim as our invention:

1. In a system for optical heterodyning of two light beams, a photosensitive surface comprising:
    a. a first photosensitive section;
    b. a second photosensitive section;
    c. an insulating strip located between said first and second sections;
    d. means for collecting current produced in said first section;
    e. means for collecting current produced in said second section; and
    f. means for obtaining the difference current of said currents in said first and second sections, whereby the amplitude of said difference current is a preselected function of the angle of incidence of said light beams.

2. The system of claim 1 wherein the shape of said photosensitive surface with respect to X and Y coordinates is defined by the mathematical equation:

$$Y(x) = A \int_{-\infty}^{+\infty} F(s) \cos (2\pi s) x \, ds + A \int_{-\infty}^{+\infty} F(s) \sin (2\pi s) x \, ds$$

where $$S = \frac{\sin \alpha_1 + \sin \alpha_2}{\lambda}$$

$A$ is constant proportional to the photosensitive surface area.

$\lambda$ is the wavelength of the light beams.

$\alpha_1$ is the angle of incidence of the first light beam.

$\alpha_2$ is the angle of incidence of the second light beam.

$F_s$ is the desired functional relationship between the amplitude of the output current and the angle of incidence of the light beams.

3. The system of claim 2 wherein each of said photosensitive sections comprises a plurality of photosensitive regions.

4. The system of claim 3 further comprising means for collecting and adding currents in each of said regions of said first section and means for collecting and adding currents in each of said regions of said second section.

5. The system of claim 4 further comprising means for obtaining an output voltage produced by the difference current of said first and second sections.

6. In an optical heterodyning system having a photosensitive surface for producing electrical current responsive to light excitation, the improvement comprising a photosensitive surface with respect to X and Y coordinates shaped to conform to the inverse Fourier transform of a preselected amplitude of current as a function of the angle of incidence of said light.

7. The system of claim 6 wherein the shape of said photosensitive surface is defined by the mathematical equation:

$$Y(x) = A \int_{-\infty}^{+\infty} F(s) \cos (2\pi s) x \, ds + A \int_{-\infty}^{+\infty} F(s) \sin (2\pi s) x \, ds$$

where $$S = \frac{\sin \alpha_1 + \sin \alpha_2}{\lambda}$$

$A$ is constant proportional to the photosensitive surface area.

$\lambda$ is the wavelength of the light beams.

$\alpha_1$ is the angle of incidence of the first light beam.

$\alpha_2$ is the angle of incidence of the second light beam.

$F(s)$ is the desired functional relationship between the amplitude of the output current and the angle of incidence of the light beams.

* * * * *